(12) United States Patent  (10) Patent No.: US 12,079,064 B2
He et al.                  (45) Date of Patent:     Sep. 3, 2024

(54) CHIP-PROCESS-VARIATION-AWARE POWER-EFFICIENCY OPTIMIZATION

(71) Applicant: HUAWEI TECHNOLOGIES CO., LTD., Shenzhen (CN)

(72) Inventors: Jiangqi He, Chandler, AZ (US); Zipeng Luo, Shenzhen (CN); Tae Hong Kim, Chandler, AZ (US); Tianming Zhang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 12 days.

(21) Appl. No.: 17/832,207

(22) Filed: Jun. 3, 2022

(65) Prior Publication Data

US 2022/0300063 A1  Sep. 22, 2022

Related U.S. Application Data

(63) Continuation of application No. PCT/US2019/064443, filed on Dec. 4, 2019.

(51) Int. Cl.
G06F 1/00        (2006.01)
G06F 1/3234      (2019.01)
G06F 1/3296      (2019.01)

(52) U.S. Cl.
CPC .......... *G06F 1/3296* (2013.01); *G06F 1/3253* (2013.01)

(58) Field of Classification Search
CPC ........ G06F 1/3296; G06F 1/3253; G06F 1/26; G06F 1/3203; Y02D 10/00
See application file for complete search history.

(56) References Cited

U.S. PATENT DOCUMENTS

| 7,581,120 B1 * | 8/2009 | Hartman ............. G06F 1/324 327/158 |
| 8,370,654 B1 * | 2/2013 | Hasko ................. G06F 1/26 323/224 |
| 2007/0096775 A1 * | 5/2007 | Elgebaly ............. G06F 1/3296 327/261 |

(Continued)

FOREIGN PATENT DOCUMENTS

CN  101682516 A  3/2010
CN  101689071 A  3/2010

(Continued)

OTHER PUBLICATIONS

Renesas, "Digital Dual Output, 4-Phase Configurable, PWM Controller with Adaptive Voltage Scaling Bus," ISL68134, Jun. 19, 2017, 50 pages.

(Continued)

*Primary Examiner* — Xuxing Chen
(74) *Attorney, Agent, or Firm* — Conley Rose, P.C.

(57) ABSTRACT

A chip-to-chip process variation aware power efficiency optimization method that includes determining, using an adaptive voltage scaling (AVS) module of a processing unit in a system, an optimal voltage identification (VID) based on chip process variation. The method outputs the optimal VID from the AVS module to a voltage regulator of the system. The method adjusts a direct current (DC) load line setting based on the optimal VID of the processing unit in the system. The method regulates, using the voltage regulator of the system, a voltage supplied to the processing unit based on the DC load line setting.

20 Claims, 4 Drawing Sheets

(56) References Cited

U.S. PATENT DOCUMENTS

| | | | |
|---|---|---|---|
| 2009/0077402 A1 | | 3/2009 | Huang et al. |
| 2011/0089914 A1* | | 4/2011 | Hartman .................... G06F 1/26 |
| | | | 323/234 |
| 2011/0154066 A1 | | 6/2011 | Ravichandran et al. |
| 2014/0191794 A1 | | 7/2014 | Krishnappa et al. |
| 2019/0041951 A1* | | 2/2019 | Shapira ................. G06F 1/3206 |
| 2019/0050039 A1 | | 2/2019 | Atkinson et al. |

FOREIGN PATENT DOCUMENTS

| | | | |
|---|---|---|---|
| CN | 104903816 A | | 9/2015 |
| CN | 106873696 A | | 6/2017 |
| JP | 2011134324 A | | 7/2011 |
| JP | 2017049652 A | | 3/2017 |

OTHER PUBLICATIONS

Renesas,"Digital Dual Output, 4-Phase Configurable, PWM Controller with Adaptive Voltage Scaling Bus," Jun. 19, 2017, 50 pages.
Shoji, T., "Digital PWM controller capable of controlling up to 450A," EE Times Japan, Nov. 7, 2016, [Access date: Aug. 28, 2023], Retrieved from the internet: https://eetimes.itmedia.co.jp/ee/articles/1611/07/news080.html, total: 7 pages (with english translation).

* cited by examiner

CHIP-PROCESS-VARIATION-AWARE POWER-EFFICIENCY OPTIMIZATION

CROSS-REFERENCE TO RELATED APPLICATIONS

This application is a continuation of International Application No. PCT/US2019/064443 filed on Dec. 4, 2019 by Futurewei Technologies, Inc., and titled "Chip-Process-Variation-Aware Power-Efficiency Optimization," which is hereby incorporated by reference in its entirety.

TECHNICAL FIELD

The present disclosure relates generally to power optimization, and more specifically related to a chip-process-variation-aware power-efficiency optimization system and method.

BACKGROUND

With ever increasing demand for computational power, power efficiency has been one of the most critical decision factors for a chief technology officer (CTO) of a big datacenter company. Considering the size of the datacenter that they are managing and workload running on their servers, even a 1% power efficiency improvement on each system can result in a significant amount in cost reduction.

SUMMARY

The present disclosure applies to a chip-process-variation-aware power-efficiency optimization system and method. With the embodiments proposed in this disclosure, an optimal direct current (DC) load line is set based on chip-to-chip process variations so that systems can operate at their maximum power efficiency, which in turn reduces power consumption and cost.

A first aspect relates to a chip-to-chip process variation aware power efficiency optimization method. The method includes determining, using an adaptive voltage scaling (AVS) module of a processing unit in a system, an optimal voltage identification (VID) based on chip process variation. The method outputs the optimal VID from the AVS module to a voltage regulator of the system. The voltage regulator adjusts a DC load line setting based on the optimal VID of the processing unit in the system. The voltage regulator regulates, a voltage supplied to the processing unit based on the DC load line setting.

A second aspect relates to a system configured to optimize power efficiency based on chip-to-chip process variations. The system includes a voltage regulator and a processing unit having an AVS module. The AVS module is configured to determine an optimal VID based on chip process variation, and output the optimal VID to the voltage regulator. The voltage regulator is configured to adjust a DC load line setting based on the optimal VID of the processing unit in the system, and regulate a voltage supplied to the processing unit based on the DC load line setting.

In a first implementation form according to any of the preceding aspect, the AVS module outputs the optimal VID to the voltage regulator via a high-speed interface providing at least a one-megahertz (1 MHz) bus speed.

In a second implementation form according to any of the preceding aspects or any of the preceding implementation form of any of the preceding aspects, the AVS module outputs the optimal VID to the voltage regulator via any high-speed interfaces such as power management bus (PM-Bus) with AVS version 1.3 or higher, SVID, SVI, etc.

In a third implementation form according to any of the preceding aspects or any of the preceding implementation form of any of the preceding aspects, the DC load line setting is set to (VID AVS−Vmin)/(Imax−Imin), where VID AVS is the optimal VID of the processing unit determined by the AVS module, Vmin is a minimum voltage setting of the processing unit, Imax is a maximum current setting of the processing unit, and Imin is a minimum current setting of the processing unit.

In a fourth implementation form according to any of the preceding aspects or any of the preceding implementation form of any of the preceding aspects, the chip-to-chip process variation aware power efficiency optimization method is performed periodically at predefined intervals to adjust the DC load line setting due to aging of the processing unit.

In a fifth implementation form according to any of the preceding aspects or any of the preceding implementation form of any of the preceding aspects, the chip-to-chip process variation aware power efficiency optimization is performed during a powering up stage of the system.

For the purpose of clarity, any one of the foregoing implementations may be combined with any one or more of the other foregoing implementations to create a new embodiment within the scope of the present disclosure.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
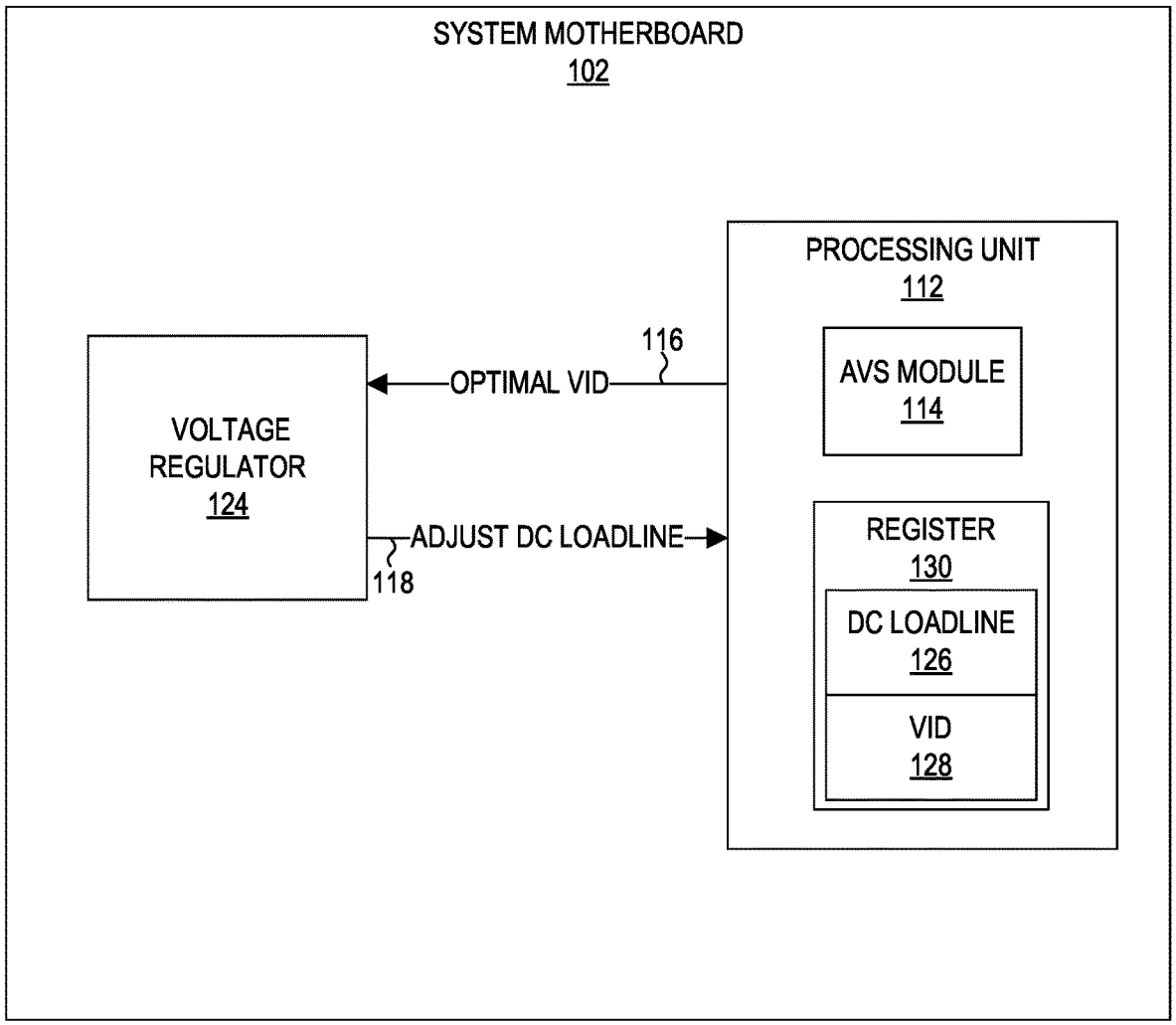
FIG. 1 is a schematic drawing illustrating a system motherboard in accordance with an embodiment of the present disclosure.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

As used within the written disclosure and in the claims, the terms "including" and "comprising" are used in an open-ended fashion, and thus should be interpreted to mean "including, but not limited to". Unless otherwise indicated, as used throughout this document, "or" does not require mutual exclusivity, and the singular forms "a", "an" and "the" are intended to include the plural forms as well, unless the context clearly indicates otherwise.

A module as referenced herein may comprise of software components such as, but not limited to, data access objects, service components, user interface components, application programming interface (API) components; hardware components such as electrical circuitry, processors, and memory; and/or a combination thereof. The memory may be volatile memory or non-volatile memory that stores data and computer executable instructions. The computer executable instructions may be in any form including, but not limited to, machine code, assembly code, and high-level programming code written in any programming language. The module may be configured to use the data to execute one or more instructions to perform one or more tasks.

Unless otherwise stated, the various methods or processes described herein may be performed on any type of system or device having a processor capable of executing instructions that implement the process. The instructions may be stored in a data storage component or a memory unit of the system. The instructions may be written in any type of programming language and may be packaged in a software application or be integrated as a system function.

The present disclosure applies to a chip-process-variation-aware power-efficiency optimization system and method. Chip process variation is the naturally occurring variation in the attributes of transistors (length, widths, oxide thickness) when integrated circuits such as microprocessors are fabricated. The amount of process variation becomes particularly pronounced as the size of the processors become smaller because the variation becomes a larger percentage of the full length or width of the component.

Lots of research and technology development have been geared towards dynamically controlling the voltage for a processing unit because the processing unit is the single most power consuming component of a system. One adopted technology is the use of a DC load line for a voltage regulator. The DC load line enables processing units to operate at the lowest possible voltage during their high loading condition to save power consumption. Currently, a voltage regulator or voltage regulator sub-system is configured to set the DC load line for the worst-case corner so that the processing unit meets the most demanding application throughput requirements under worst case operating conditions. Because of this, nominal or the best corner case chips tend to have an unwanted guard band, which leads to a waste of power.

With the embodiments proposed in this disclosure, a voltage regulator or voltage regulator sub-system will use an optimal DC load line based on chip-to-chip process variations so that systems can operate at their maximum power efficiency, which in turn can result in tons of power savings for modern power-hungry electronic devices. For example, using the disclosed embodiments, even at a 1% power efficiency improvement, a large datacenter can potentially save hundreds of millions in cost related to power usage.

FIG. 1 is a schematic drawing illustrating a system motherboard 102 in accordance with an embodiment of the present disclosure. The system motherboard 102 is the main printed circuit board found in most electronic devices/systems that enables communication between many of the crucial electronic components of the system, such as, but not limited to, a central processing unit (CPU), memory, data storage, video and network interfaces, and input/output connectors for other peripherals.

For simplicity purposes only, the system motherboard 102 in FIG. 1 only illustrates the interaction between a processing unit 112 and a voltage regulator 124 of the system motherboard 102 in accordance with an embodiment of the present disclosure. The processing unit 112 can be any type of electronic circuitry or processor such as a CPU that can carry out programmable instructions by performing the basic arithmetic, logic, control, and input/output operations specified by the instructions. The processing unit 112 is not limited to any particular manufacturer, processing capability or performance, number of processing cores, or cache size. For example, in some embodiments, the processing unit 112 can be large-scale complementary metal-oxide-semiconductor (CMOS) application-specific integrated circuits (ASICs), field-programmable gate array (FPGA), central processing unit (CPU), graphic processing unit (GPU), network processing unit, neural processing unit, and other digital systems on a chip (SoCs).

In an embodiment, the voltage regulator 124 is a traditional power architecture using analog circuitry. In an alternative embodiment, the voltage regulator 124 can be designed as a processor-based voltage regulator. The voltage regulator 124 is configured to provide the processing unit 112 the appropriate supply voltage for powering the processing unit 112. In some embodiments, the voltage regulator 124 can be configured to provide the appropriate supply voltage to multiple processors with different voltage requirements. This enables multiple processors to be mounted on the same system motherboard 102. In some embodiments, the voltage regulator 124 is a voltage regulator sub-system of a larger voltage regulator system. For simplicity purposes, the term voltage regulator as used in this disclosure will mean either a voltage regulator or a voltage regulator sub-system.

In the depicted embodiment, the processing unit 112 includes an AVS module 114 that is configured to perform AVS. AVS is a closed-loop dynamic power control technique which can be used to optimize power consumption based on real operation conditions of the processing unit 112. The AVS module 114 can include hardware performance monitoring circuits that are configured to determine the processing unit 112 exact process corner or operating conditions. The AVS module 114 can be configured to run in a real-time, continuous closed-loop operation for maintaining the minimum energy requirement to meet the performance level of the overall system.

In an embodiment, the AVS module 114 outputs an optimal VID 116 to the voltage regulator 124. A VID is a voltage identification that determines the maximum voltage for the processing unit 112. A VID 128 and a DC loadline 126 of the processing unit 112 can be stored in a register 130 of the processing unit 112. The VID 128 is initially set at factory level by a manufacturer of the processing unit 112 while the processing unit 112 is running at full load. The factory level VID setting is often referred to as the stock voltage of the chip. However, each processing unit 112 has a slightly different operating voltage due to chip-to-chip variations. An optimal VID 116 is a VID that sets the maximum voltage based on the actual chip variation of the processing unit 112. The voltage regulator 124 uses the optimal VID 116 from the AVS module 114 to adjust a supply voltage of the processing unit 112 by updating the VID 128 and the DC loadline 126.

Currently, the voltage regulator 124 is configured to set the DC load line 126 for the worst-case corner so that the processing unit 112 meets the most demanding application throughput requirements under worst case operating conditions. Because of this, nominal or the best corner case chips tend to have an unwanted guard band. As a result, there is an undesired power loss for nominal and best corner case chips.

Thus, in accordance with an embodiment, a novel power efficiency optimization method is disclosed for a process-variation-aware system. In an embodiment, the voltage regulator 124 adjusts the DC load line 126 setting based upon chip-to-chip variation to control voltage output to the processing unit 112. For instance, the operating conditions of the processing unit 112 on each system can be determined depending on chip-to-chip process variations through monitoring circuits of the AVS module 114. In an embodiment, the voltage regulator 124 adjusts the DC load line 126 setting based on the optimal VID 116 from the AVS module 114 to optimize power consumption to increase the system power efficiency.

Thus, the disclosed optimization methods can flexibly adjust the value of DC loadline 126 according to the difference between chip processes to reduce the chip power consumption of the processing unit 112. As an example, first, the processing unit 112 sets the DC 128 according to the worst-case process to ensure that the voltage in any case is not lower than the Vmin value of the processing unit 112. A mapping between the process corner, DC loadline 126, and DC voltage of the processing unit 112 can be stored in a register 130 of the processing unit 112. After reading the process corner value in the register 130, the processing unit 112 sends the new DC loadline and DC voltage requirements (i.e., optimal VID 116) to the voltage regulator 124. After receiving the requirements, the voltage regulator 124 reduces the DC voltage and the value of the DC loadline 126 to ensure that the voltage is not lower than the Vmin value of the processing unit 112. The voltage regulator 124 updates the new VID value 128 and the value of the DC loadline 126.

Figure 2:
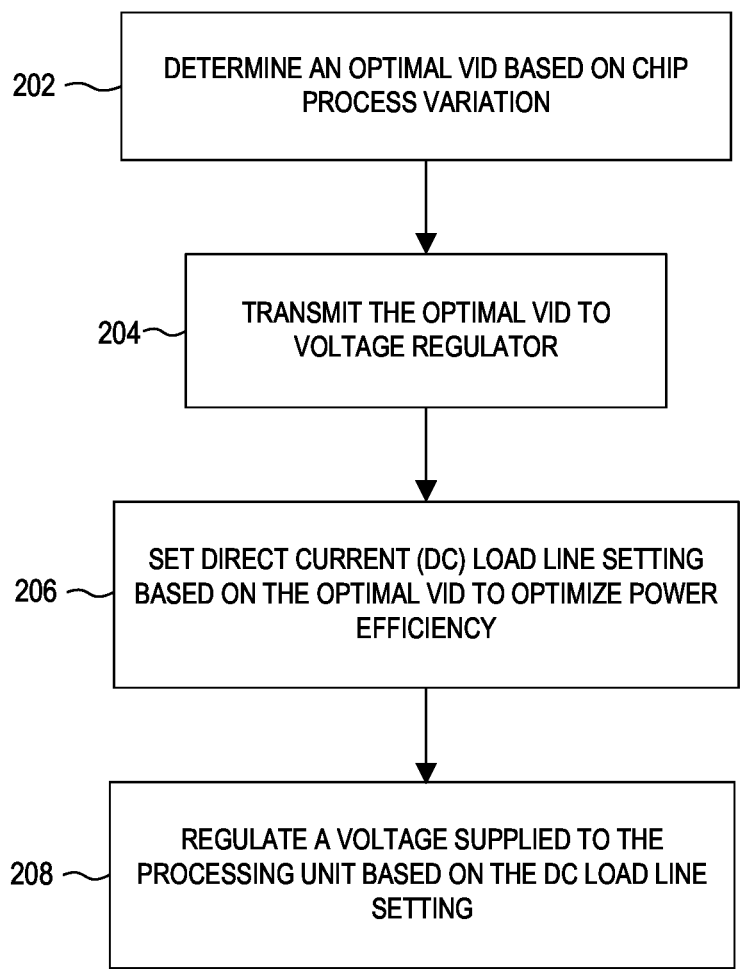
FIG. 2 is a flowchart illustrating a process for performing power-efficiency optimization for a chip-process-variation-aware system in accordance with an embodiment of the present disclosure.

FIG. 2 is a flowchart illustrating a process 200 for performing power-efficiency optimization for a chip-process-variation-aware system in accordance with an embodiment of the present disclosure. The process 200 can be performed by any type of device or system that includes a processor, AVS monitoring circuits or module, and a voltage regulator system or sub-system. As a non-limiting example, the process 200 can be performed by the system 400 of FIG. 4.

The process 200 begins at step 202 by determining an optimal VID of a processing chip of a system. The optimal VID can vary depending on chip-to-chip process variations. For example, the optimal VID or operating voltage for a worst-case corner chip (WCC) can be substantially higher than the optimal VID nominal or the best corner case chips. The optimal VID for a particular chip can also change over time due to system degradation or component degradation. In an embodiment, the optimal VID is determined by an AVS module in real time using AVS monitoring circuits within the processing chip that are configured to read the chip operating conditions. The AVS module can then output an operating voltage based on chip process variation.

At step 204, the process 200 transmits the optimal VID to a voltage regulator of the system. In an embodiment, the AVS module outputs the optimal VID to the voltage regulator via a high-speed interface using PMBus version 1.3 and above. PMBus is an open standard, power management protocol. In an embodiment, the high-speed interface provides at least a 1 MHz bus speed.

Figure 3:
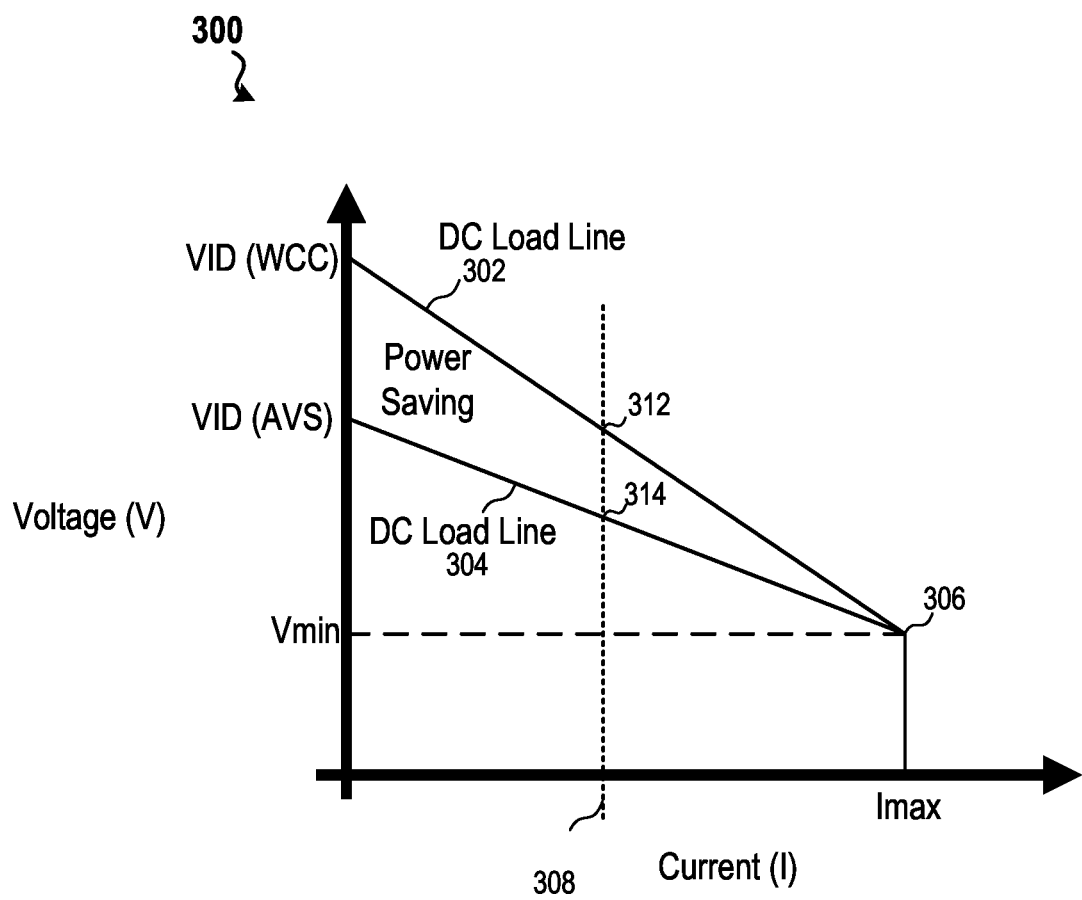
FIG. 3 is a graph illustrating an example of power saving in accordance with an embodiment of the present disclosure.

The process 200, at step 206, sets a DC load line setting based on the optimal VID of the processing unit in the system. For example, the DC load line setting can change a maximum processor voltage based on the VID (WCC) to a maximum processor voltage based on the VID (AVS). As a non-limiting example, the DC load line setting can change the maximum processor voltage from 1.2 volts (V) based on the VID (WCC) to maximum processor voltage of 1.1V based on the VID (AVS). The power savings based on the change in the maximum processor voltage based on the VID (AVS) is illustrated in FIG. 3.

At step 208, the process 200 regulates, using the voltage regulator of the system, a voltage supplied to the processing unit based on the DC load line setting to optimize system power efficiency. For example, if the voltage regulator output current (Iout) is one amp (1 A) and the parasitic resistance on the path between the voltage regulator output and the processing unit (Rpath) is 0.1 ohm, then the voltage drop on the path is 1 A*0.1 ohm=0.1V. Prior to adjusting the DC load line, the voltage regulator output voltage (Vout) is equal to the voltage set by the VID for a worst-case corner chip (VID (WCC))+0.1V. As an example, if VID (WCC)=1V, then prior to adjusting the DC load line, Vout=1.1V. However, in an embodiment, with the DC load line adjusted based on the optimal VID determined by the AVS, then Vout=VID (AVS)+0.1V. As an example, if (VID (AVS))=0.9V, then Vout=1V. Thus, in the given example, using the VID (AVS) as compared to the VID (WCC) results in 0.1V decrease being supplied to the processing unit. Although, this decrease may seem insignificant, if the disclosed embodiments are performed for hundreds of thousands or millions of processors, each having one or more core processing cores (e.g., each multicore processor can have dozens of cores), the cost savings in power reduction can be tremendous.

In addition, the process 200 can apply to a single-voltage processor that uses a single power voltage throughout the chip or to a multi-voltage processor that allows different voltages to be used for different parts of the processor (e.g., a lower voltage can be used in the processor core while a higher voltage is used for external input/output (I/O)). In the case of a multi-voltage processor, the process 200 can be performed for each part of the multi-voltage processor requiring a supply voltage. In various embodiments, the process 200 can be called or configured to run during a boot up process or powering up stage of a system, periodically at predefined intervals (e.g., every 90 days) to adjust the DC load line setting due to aging of the processing unit and/or aging of the other components of the system, and/or the process 200 may be configured to run constantly in real time during system operation.

For example, supposed the voltage regulator 124 supply normally predetermined VID 128 (for example: 1.0V) to the processing unit 112 after power on. The processing unit 112 reads process, voltage, and temperature (PVT) data which is stored in the register 130, then sends the operation voltage requirement (optimal VID 116) to the voltage regulator 124. The voltage regulator 124 adjusts the VID 128 to meet operation voltage requirement from processing unit (0.95V), also sets the DC LL 126 (0.6 mohm) based on the recommended VID. This process can continue in real time. For instance, as temperature changes occur, the processing unit 112 reads the PVT data stored in register 130 then resends the operation voltage requirement (optimal VID 116) to the voltage regulator 124. The voltage regulator 124 adjusts the VID 128 to meet other operation voltage requirement from the processing unit 112 (0.9V), and also sets the DC LL 126 (0.5 mohm) based on the recommended VID.

FIG. 3 is a graph 300 illustrating an example of power saving in accordance with an embodiment of the present disclosure. The graph 300 displays voltage (V) against current (I). The graph 300 illustrates an example of a DC load line 302 based on a VID (WCC) setting, and an example of a DC load line 304 based on a VID (AVS) setting in accordance with the disclosed embodiments. The DC load line is a line drawn from a maximum voltage setting Vmax as determined by the VID setting to a point 306, where a minimum voltage setting (Vmin) intersects a maximum current (Imax) setting. The DC load line is used to determine the correct DC operating voltage based on the load current.

As previously stated, currently the DC load line 302 is set based on the worst-case corner VID (WCC), which results in a waste of power for nominal or the best corner case chips. The DC load line 302 can be calculated using the following formula: DC load line 302=(VID (WCC)−Vmin)/(Imax−Imin).

Using the disclosed embodiments, the DC load line is adjusted or set based on the VID (AVS) as illustrated by the DC load line 304 in FIG. 3. The DC load line 304 can be calculated using the following formula: DC load line 304= (VID (AVS)−Vmin)/(Imax−Imin). As illustrated in FIG. 3, using the adjusted DC load line 304 with the VID (AVS) setting, less voltage is used for the same current loading as compared to the voltage output based on the DC load line 302 using the VID (WCC) setting. For example, at the current level 308, the voltage output for the DC load line 302 using the VID (WCC) setting is indicated by voltage 312, and the voltage output for the DC load line 304 using the VID (AVS) setting is indicated by voltage 314. The difference in voltage (voltage 312−voltage 314)*current 304 is the power being saved based on the disclosed embodiments. Thus, using the disclosed embodiments, each system can operate at the lowest possible voltage range based on the optimal VID determined by the AVS to save power.

Figure 4:
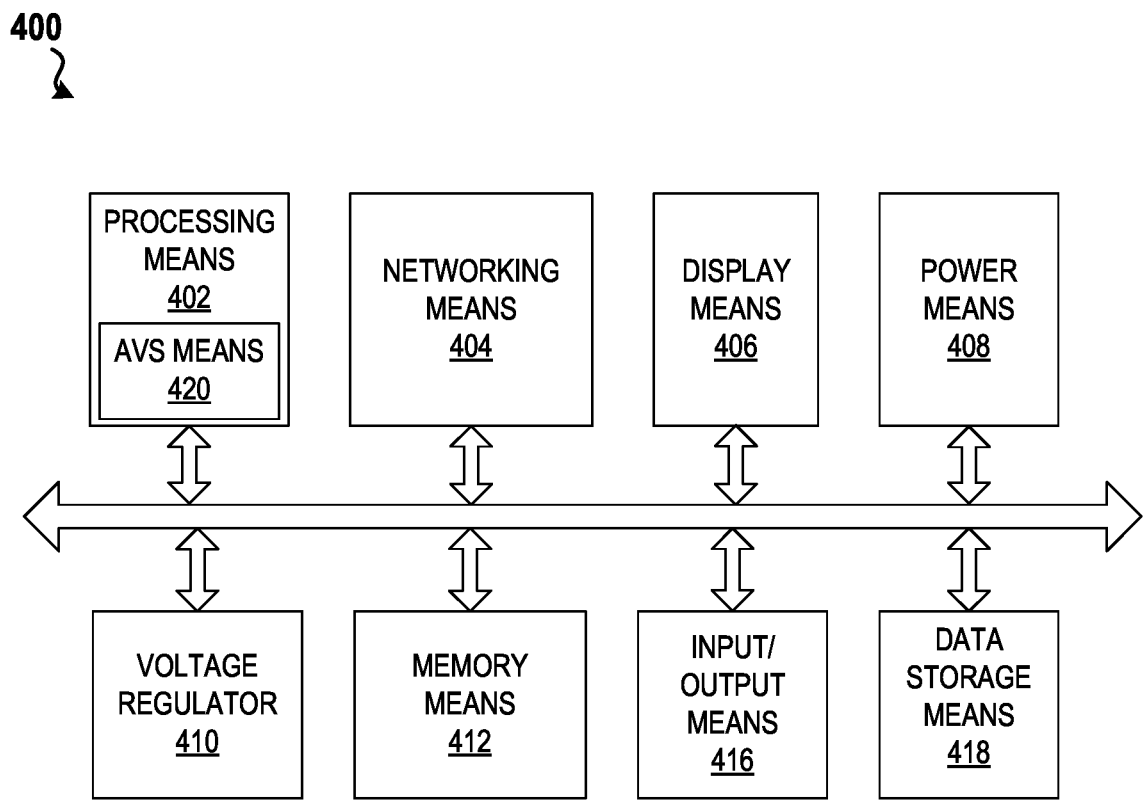
FIG. 4 is a block diagram of a system in accordance with an embodiment of the present disclosure.

FIG. 4 is a block diagram illustrating a system 400 in accordance with an embodiment of the present disclosure. For example, the system 400 can be used to perform the processes described in accordance with FIG. 1, FIG. 2, and FIG. 3.

The system 400 includes processing means 402, networking means 404, display means 406, power means 408, voltage regulator means 410, memory means 412, input/output (I/O) means 416, data storage means 418, and AVS means 420. Although only a single unit of each of the above components is depicted, the system 400 can include multiple units of each component. For example, the system 400 can include one or more processing means 402 such as multiple processors, a single processor having multiple processing cores, multiple microprocessors, and other circuitry capable of being programmed or capable of executing instructions for implementing the embodiments of the present disclosure. For example, the processing means 402 can execute instructions for performing a chip-to-chip process variation aware power efficiency optimization method as described herein. Additionally, in some embodiments, the instructions for implementing the embodiments of the present disclosure may be distributed and executed across multiple processing units or sub-units that cooperate in executing the program instructions. In certain embodiments, one or more digital signal processors (DSPs) may be included as part of the system 400 in place of or in addition to a general-purpose CPU. In accordance with the disclosed embodiments, the processing means 402 can include an AVS means 420. The AVS means 420 can include memory, electrical components and circuitry, and its own processing components for determining an optimal VID based on chip process variation and/or operating environment conditions. In some embodiments, the AVS means 420 may be a separate component from the processing means 402.

The networking means 404 enable the system 400 to communicate data with other devices (not shown) over a communication network or collection of networks (not shown). Communications may be in the form of wired or wireless communication, and is not limited to any particular protocol. The networking means 404 may include network interface cards, antennas, power amplifiers, radio frequency (RF) circuitry, transceivers, and other communication circuitry.

The display means 406 may be an integrated display component of the system 400. Alternatively, the display means 406 may be a display port or graphics card that enables an external monitor or display to be coupled to the system 400. The power means 408 can be a battery unit or a power unit that converts alternating current (AC) to low-voltage regulated DC power for the internal components of the system 400.

The voltage regulator means 410 is configured to provide the appropriate supply voltage to the processing means 402. In some embodiments, the voltage regulator means 410 may be responsible for regulating the voltage to other components of the system 400. For example, the voltage regulator means 410 may comprise of a plurality of voltage regulator subsystems or may be a voltage regulator subsystem that is responsible for regulating the voltage for a particular component such as the processing means 402. In some embodiments, the voltage regulator means 410 can include a voltage converter for converting a first voltage to a second voltage (e.g., from a higher voltage to a lower voltage).

The memory means 412 provide a means for temporarily storing data and instructions. For example, the memory means 412 can be volatile memory such as, but not limited to, random access memory (RAM). In an embodiment, the memory means 412 can be used to store instructions for implementing the disclosed embodiments. In an embodiment, the memory means 412 is located inside a voltage regulator controller and is used to store the DC load line setting.

The I/O means 416 such as I/O interfaces enable the system 400 to be communicatively coupled to other devices. For example, the I/O means 416 may enable an input device such as, but not limited to, a pointing device or keyboard to be used with the system 400.

The data storage means 418 can be nonvolatile memory such as, but are not limited to, a hard disk drive (HDD), flash memory, and a solid-state drive (SSD). In some embodiments, the data storage means 418 may be removable or may be an external drive. The data storage means 418 may be implemented as a single storage device but may also be implemented across multiple storage devices or sub-systems co-located or distributed relative to each other. Additionally, in some embodiments, the data storage means 418 can be a computer readable storage media capable of storing software including instructions for performing various processes (e.g., a computer program product stored on a non-transitory medium). Software may also include additional processes, programs, or components, such as operating system software, database management software, or other application software. Software may also include firmware or some other form of machine-readable processing instructions executable by the processing means 402.

It should be noted that one or more components of the system 400 may be included in a system-on-a-chip (SoC) device. These components may include, but are not limited to, the processing means 402, elements of the data storage means 418, and even elements of the networking means 404. One of ordinary skill in the art would recognize that the system 400 may also include other components not depicted or described in FIG. 4, or alternatively, the system 400 can exclude certain components depicted in FIG. 4 without affecting the scope of the various embodiments.

Accordingly, the disclosed embodiments provide various novel chip-process-variation-aware power-efficiency optimization systems and methods. In particular, with the embodiments described in this disclosure, an optimal DC load line is set based on chip-to-chip process variations so that systems can operate at their maximum power efficiency, which in turn reduces power consumption and cost.

Prior to the embodiments disclosed herein, it would have been not have been feasible or practical to achieve the benefits of the disclosed embodiments due to several technical issues including, but not limited to, the necessity for a high-speed interface between the processing unit's AVS module and a voltage regulator. Such an interface did not exist until recently (e.g., PMBUS 1.3 with AVS). Without such an interface, it would not be possible to use the AVS output to adjust the DC load line. In addition, the disclosed embodiments have a silicon area cost and the saving could be small depending on applications. Thus, the benefit would have been negligible until the recent demand for high power applications.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, components, techniques, or methods without departing from the scope of the present disclosure. Other examples of changes, substitutions, and alterations are ascertainable by one skilled in the art and may be made without departing from the spirit and scope disclosed herein.

What is claimed is:

1. A method comprising:
  determining, by an adaptive voltage scaling (AVS) module of a processing unit in a system, an optimal voltage identification (VID) based on a chip process variation;
  outputting, by the AVS module, the optimal VID to a voltage regulator of the system;
  setting a direct current (DC) load line setting based on the optimal VID of the processing unit in the system; and
  regulating, by the voltage regulator of the system, a voltage supplied to the processing unit based on the DC load line setting.

2. The method of claim 1, wherein the AVS module outputs the optimal VID to the voltage regulator via high-speed interface providing at least a one-megahertz (1 MHz) bus speed.

3. The method of claim 1, wherein the AVS module outputs the optimal VID to the voltage regulator via a high-speed interface using a power management bus (PMBus) with AVS version 1.3 or higher.

4. The method of claim 1, wherein the DC load line setting is set to (VID AVS−Vmin)/(Imax−Imin), where VID AVS is the optimal VID of the processing unit determined by the AVS module, Vmin is a minimum voltage setting of the processing unit, Imax is a maximum current setting of the processing unit, and Imin is a minimum current setting of the processing unit.

5. The method of claim 1, wherein the method is performed periodically at predefined intervals to adjust the DC load line setting due to aging of the processing unit.

6. The method of claim 1, wherein the method is performed during a powering up stage of the system.

7. The method of claim 1, wherein the DC load line setting is preset based on a worst-case corner VID.

8. A system configured to optimize power efficiency based on chip-to-chip process variations, the system comprising:
  a voltage regulator;
  a processing unit having an adaptive voltage scaling (AVS) module, the AVS module configured to determine an optimal voltage identification (VID) based on a chip process variation, and output the optimal VID to the voltage regulator; and
  the voltage regulator configured to adjust a direct current (DC) load line setting based on the optimal VID of the processing unit in the system, and regulate a voltage supplied to the processing unit based on the DC load line setting.

9. The system of claim 8, wherein the AVS module comprises a software module comprising instructions stored in non-transitory memory that when executed by the processing unit determines the optimal VID based on the chip process variation.

10. The system of claim 8, wherein the AVS module comprises circuitry.

11. The system of claim 10, wherein the AVS module comprises one of application specific integrate circuitry or field programmable gate array circuitry.

12. The system of claim 8, further comprising a high-speed interface providing at least a one-megahertz (1 MHz) bus speed between the AVS module and the voltage regulator, and wherein the AVS module outputs the optimal VID to the voltage regulator via the high-speed interface.

13. The system of claim 8, further comprising a high-speed interface that implements a power management bus (PMBus) with AVS version 1.3 or higher, and wherein the AVS module outputs the optimal VID to the voltage regulator via the high-speed interface.

14. The system of claim 8, wherein the DC load line setting is set to (VID AVS−Vmin)/(Imax−Imin), where VID AVS is the optimal VID of the processing unit determined by the AVS module, Vmin is a minimum voltage setting of the processing unit, Imax is a maximum current setting of the processing unit, and Imin is a minimum current setting of the processing unit.

15. The system of claim 8, wherein the system is configured to optimize power efficiency based on chip-to-chip process variations periodically at predefined intervals to adjust the DC load line setting due to aging of the processing unit.

16. The system of claim 8, wherein the system is configured to optimize power efficiency based on chip-to-chip process variations during a powering up stage of the system.

17. The system of claim 8, wherein the DC load line setting is preset based on a worst-case corner VID.

18. A computer program product for optimizing power to a system based on chip-to-chip process variations, the computer program product comprising computer executable instructions stored on a non-transitory computer readable medium such that when executed by a processing unit of the system cause the system to:

determine an optimal voltage identification (VID) based on a chip process variation;
set a direct current (DC) load line setting based on the optimal VID of the processing unit in the system; and
regulate a voltage supplied to the processing unit based on the DC load line setting.

19. The computer program product of claim 18, wherein the computer executable instructions when executed by the processing unit of the system further causes the system to output the optimal VID to a voltage regulator via a high-speed interface providing at least a one-megahertz (1 MHz) bus.

20. The computer program product of claim 18, wherein the DC load line setting is set to (VID AVS−Vmin)/(Imax−Imin), where VID AVS is the optimal VID of the processing unit determined by an AVS module, Vmin is a minimum voltage setting of the processing unit, Imax is a maximum current setting of the processing unit, and Imin is a minimum current setting of the processing unit.

* * * * *